United States Patent [19]
Tateishi et al.

[11] Patent Number: 5,220,551
[45] Date of Patent: Jun. 15, 1993

[54] SPINDLE CONTROL APPARATUS FOR DISK PLAYER

[75] Inventors: Kiyoshi Tateishi; Tsutomu Takahashi, both of Tokorozawa, Japan

[73] Assignee: Pioneer Electronic Corporation, Tokyo, Japan

[21] Appl. No.: 736,331

[22] Filed: Jul. 26, 1991

[30] Foreign Application Priority Data

Jan. 24, 1991 [JP] Japan .................. 3-006927

[51] Int. Cl.$^5$ .............................................. G11B 7/00
[52] U.S. Cl. ......................................... 369/50; 369/32
[58] Field of Search .......................... 369/32, 50, 111; 360/78.06

[56] References Cited

U.S. PATENT DOCUMENTS

| | | | |
|---|---|---|---|
| 4,641,294 | 2/1987 | Yoshimaru | 369/32 |
| 4,750,055 | 6/1988 | Van Lier | 369/50 |
| 4,789,975 | 12/1988 | Taniyama | 369/50 |
| 4,984,227 | 1/1991 | Yoshimaru | 369/32 |

Primary Examiner—Donald McElheny, Jr.
Attorney, Agent, or Firm—Sughrue, Mion, Zinn, Macpeak & Seas

[57] ABSTRACT

A spindle control apparatuses for a disk player allows a quick search of recorded data on a disk carrying a plurality of types of data that should be read out at different reading velocities. A spindle servo loop is rendered open in response to a command and a normal rotational velocity of the disk necessary to read out recorded data at a specific address is computed. Then the disk's rotational velocity is accelerated or decelerated in a single step until it coincides with the designated rotational velocity and the servo loop is closed when these velocities coincide with each other. This allows quick and stable locking of the spindle servo loop during the searching period, so that the searching velocity is raised considerably.

2 Claims, 4 Drawing Sheets

SPINDLE CONTROL APPARATUS FOR DISK PLAYER

BACKGROUND OF THE INVENTION

1. Field of the Invention

The present invention relates to a spindle control apparatus for a disk player which reads out data recorded on a disk called "CD-ROM".

2. Description of Background Information

On a CD-ROM, a vast amount of data such as data of video signal can be recorded. For instance, data for a high-definition still picture file would amount to about 4 Mbytes (megabytes) per picture without data compression. To read out such a high-definition still picture file at a normal reading velocity, it takes approximately 26 seconds per picture, so that over-all reading time becomes significantly long. In this respect, although data compression is normally performed to reduce the amount of data per picture, if the compressing amount is increased to further reduce the amount of data per picture, the picture quality will be deteriorated. If the velocity is increased to read a greater amount of data faster, the total reading time is shortened and it becomes unnecessary to increase the degree of the data compression. Through this method, prevention of the above-mentioned deterioration of the picture quality is possible.

In a picture file, audio data is often recorded with video data. For instance, if audio data is recorded on the basis of CD-DA, the same system as a digital audio disk called "CD", it is necessary to read out the audio data at the normal reading velocity. Therefore, a disk player which reads out recorded data from a CD-ROM needs to be designed to allow selection between two reading velocities: a reading velocity in high-velocity mode for reading out a vast amount of data, such as video data, in a short period of time, and a reading velocity in normal mode for reading out ordinary audio data.

In recording motion picture data, it is necessary to compress data using a method called "DVI", or the like because the data transfer rate at the normal reading velocity is as low as about 150 Kbytes (kilobytes) per second. The resolution of the picture is considerably lower than that of the picture provided by the NTSC system. To improve the picture resolution, the reading velocity needs to be increased for raising the data transfer rate, which reduces the amount of data compression. However, this method is undesirable since it will shorten the whole playing time of a CD-ROM disk.

In this respect, it is required that motion picture data has proper resolutions for different uses. For instance, when there are three reading velocities, namely, the normal reading velocity, a double reading velocity twice as fast as the normal reading velocity, and a quadruple reading velocity four times faster than the normal reading velocity, data may be recorded as follows:

a) At the normal reading velocity, it is possible to read out audio data recorded on the basis of the CD-DA and motion picture data, which has low resolution but ensures a long playing time.

b) At the quadruple reading velocity, it is possible to reproduce motion picture data, which has high resolution but has a short playing time.

c) At the double reading velocity, motion picture whose resolution and playing time are between those of the cases (a) and (b) respectively.

In the case where three types of data having the aforementioned three reading velocities are recorded on a CD-ROM disk in mixture, locking of the spindle servo is performed after the velocity is accelerated or decelerated toward one of a plurality of normal maximum rotational velocities for different types of recorded data as disclosed in Japanese Patent Application Laid-Open No. Sho 62-243166. In that case, the locking should be effected to two different values. This, however, resulted in a longer time for searching recorded data.

SUMMARY OF THE INVENTION

It is therefore an object of the present invention to provide a spindle control apparatus for a disk player capable of searching for data on a disk having a plurality of types of data recorded thereon, which are to be read out at different reading velocities.

According to one aspect of the present invention, there is provided a spindle control apparatus for a disk player for reading out recorded data at a designated address on a disk having address data indicating a recording position recorded thereon in addition to a coded data signal and a sync signal and reproducing the recorded data, the apparatus comprising memory means for storing in advance data representing a correlation between each address of the disk and a reading velocity necessary to read out contents of each address; reading means for reading out recorded data from the disk; sync detecting means for detecting a sync signal and producing a sync detection signal; first signal generating means for generating a first signal according to a frequency difference and a phase difference between the sync detection signal and a reference signal of a frequency according to a reading velocity corresponding to the designated address; driving means for driving the disk in response to a drive signal; rotational velocity detecting means for detecting a rotational velocity of the disk; second signal generating means for generating a second signal according to a difference between a value acquired by computing a rotational velocity of the disk necessary to read out recorded data at a reading velocity corresponding to the designated address in response to a command and a value of the rotational velocity detected by the rotational velocity detecting means, and outputting the second signal together with a switching command signal until the computed value and the detected value coincide with each other; and signal selecting means for selectively supplying the first signal as the drive signal to the drive means when the switching command signal is not present and selectively supplying the second signal as the drive signal to the drive means when the switching command signal is present.

According to another aspect of the present invention, there is provided a spindle control apparatus for a disk player for reading out recorded data at a designated address on a disk having address data indicating a recording position recorded thereon in addition to a coded data signal and a sync signal and reproducing the recorded data, the apparatus comprising memory means for storing in advance data representing a correlation between each address of the disk and a reading velocity necessary to read out contents of each address; reading means for reading out recorded data from the disk; sync detecting means for detecting a sync signal and producing a sync detection signal; first signal generating means for generating a first signal according to a frequency difference and a phase difference between the sync detection signal and a reference signal of a frequency according to a reading velocity corresponding to the designated address; driving means for driving the disk in response to a drive signal; address data detecting means for detecting address data; second signal generating means for generating a second signal according to a difference between a detected value of a rotational velocity of the disk acquired by the address data obtained by the address data detecting means and a value acquired by computing a rotational velocity of the disk necessary to read out recorded data at a reading velocity corresponding to the designated address in response to a command, and outputting the second signal together with a switching command signal for a period of time corresponding to the difference; and signal selecting means for selectively supplying the first signal as the drive signal to the drive means when the switching command signal is not present and selectively supplying the second signal as the drive signal to the drive means when the switching command signal is present.

According to the spindle control apparatuses for a disk player, which embodies the present invention, a servo loop for controlling the rotational velocity in accordance with a sync signal read out from a disk is rendered open in response to a command for accelerating or decelerating the disk's rotational velocity until it coincides with a value necessary to read out recorded data at a designated address at designated reading velocity, and the servo loop is then closed.

DETAILED DESCRIPTION OF THE PREFERRED EMBODIMENTS

Preferred embodiments of the present invention will now be described referring to the accompanying drawings.

Figure 1:
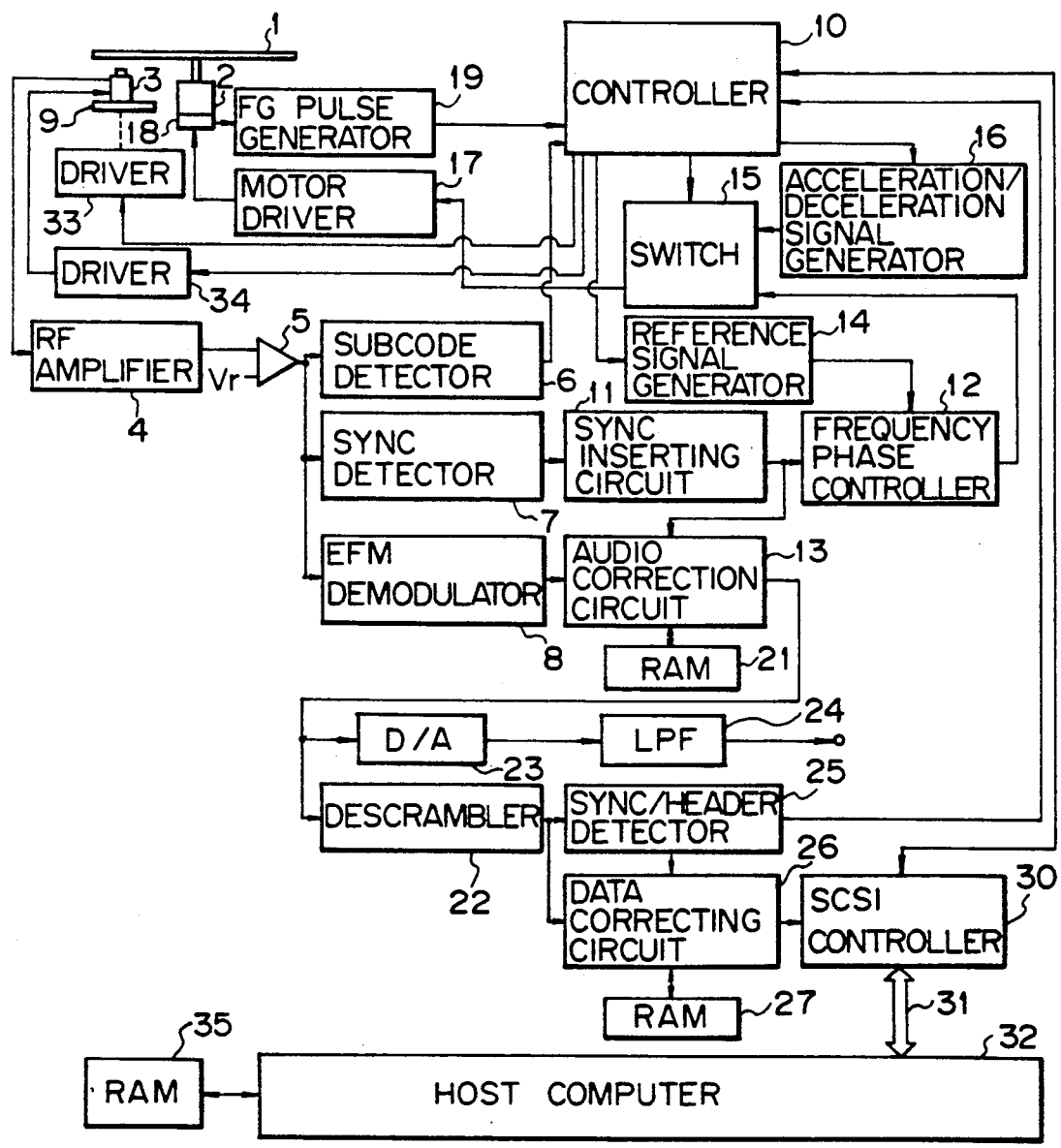
FIG. 1 is a block diagram illustrating one embodiment of the present invention.

Referring to FIG. 1, a disk 1 on which a plurality of types of data that should be read out at different reading velocities is driven by a spindle motor 2. As the disk 1 rotates, a pickup 3 picks up signals recorded on the disk 1. This pickup 3 is mounted on a slider 9 which is freely movable in the radial direction of the disk 1. The slider 9 is moved in the radial direction of the disk 1 by a driver 33. The driver 33 is designed to move the slider 9 to the inner periphery or outer periphery of the disk respectively by an inward drive command or an outward drive command, supplied from a controller 10. The pickup 3 incorporates a tracking actuator which is driven by a driver 34. The driver 34 is designed to drive the tracking actuator in response to an error signal from a tracking servo circuit (not shown) so that a data reading spot of the pickup 3 moves onto a data-carrying track on the disk 1, and to drive the tracking actuator in response to a jump command from the controller 10 so that the data reading spot of the pickup 3 moves inward or outward relative to the disk 1 by one track.

An RF (high frequency) signal, that is a reading signal from the pickup 3, is amplified by an RF amplifier 4 and then sent to a comparator 5. Slicing of the RF signal is performed by comparing the RF signal with a reference voltage Vr by the comparator 5, thereby yielding a pulse signal. The output of the comparator 5 is supplied to a subcode detector 6, a sync detector 7 and an EFM demodulator 8. The subcode detector 6 separates a subcode from the pulse signal from the comparator 5 and sends it to the controller 10. It is to be noted that the controller 10 is made up of a microcomputer which may comprise a processor, ROM, RAM, timer and so forth.

The sync detector 7 detects a sync signal from the pulse signal from the comparator 5 and outputs a sync detection signal, which in turn is sent to a sync inserting circuit 11. This circuit 11 comprises a phase-locked loop circuit designed to generate a sync signal synchronous with the sync detection signal. The sync signal from the sync inserting circuit 11 is supplied to a frequency phase controller 12 and an audio correction circuit 13. The controller 12 produces a signal corresponding to the frequency difference and phase difference between the sync signal and a reference signal from a reference signal generator 14. The reference signal generator 14 includes an oscillator for generating a signal of a predetermined frequency and a frequency divider for frequency-dividing the output of the oscillator by a frequency-dividing ratio according to data sent from the controller 10, and outputting the resultant signal as the reference signal. The output of the frequency phase controller 12 is supplied to one input terminal of a switch 15, which has the other input terminal supplied with the output of an acceleration/deceleration signal generator 16. The generator 16 produces a drive signal having the necessary level to accelerate the rotating velocity of the disk in response to an acceleration command from the controller 10, and a drive signal having the necessary level to decelerate the disk's reading velocity in response to a deceleration command from the controller 10. The switch 15 is designed to selectively transmit the output of the frequency phase controller 12 when there is no switching command from the controller 10, and to selectively transmit the output of the acceleration/deceleration signal generator 16 when the switching command is present.

The output signal of the switch 15 is supplied as a drive signal to a motor driver 17 which drives the spindle motor 2. The spindle motor 2 incorporates a frequency generator 18 which generates a pulse signal of a frequency corresponding to the rotating velocity of the spindle motor 2. The output of this frequency generator 18 is supplied to the controller 10 via an FG pulse generator 19 including a wave shaping circuit.

The EFM demodulator 8 is designed to perform EFM demodulation on the pulse signal from the comparator 5 to obtain PCM data or digital data including audio data. The digital data from the EFM demodulator 8 is fed to the audio correction circuit 13. This circuit 13 is designed to cooperate with a RAM 21 to restore digital data whose order is re-arranged by the interleave processing effected at the recording time, and to perform error correction using a CIRC (Cross Interleave Reed Solomon Code). The output data of the audio correction circuit 13 is supplied to a descrambler 22 and a D/A (digital to analog) converter 23. After the output data of the circuit 13 is converted into an analog audio signal in the D/A converter 23, the signal has its unnecessary component removed by an LPF (Low-Pass Filter) 24. The resultant signal is supplied to an audio output terminal. The descrambler 22 restores the output data of the audio correction circuit 13, whose order has been re-arranged by the scramble effected at the recording time. The output of the descrambler 22 is supplied to a sync-and-header detector 25 and a data correcting circuit 26. The sync-and-header detector 25 detects a 12-byte code, called "sync", in digital data in the CD-ROM format (hereinafter called "CD-ROM" data), and also a 4-byte code, called "header", and sends these codes to the controller 10 and the data correcting circuit 26. The data correcting circuit 26 is configured to detect the presence or absence of an EDC (Error Detection code) and that of ECC (Error Correction Code) and their positions from the outputs of the sync-and-header detector 25, and cooperate with the RAM 27 to detect and correct an error in the CD-ROM data from the descrambler 22.

The CD-ROM data having undergone the error correction in the data correcting circuit 26 is sent to a SCSI controller 30. The SCSI controller 30 sends the CD-ROM data to a host computer 32 through a SCSI bus 31, and performs data exchange and communication control between the controller 10 and the host computer 32. The host computer 32 is configured to acquire data indicating the correlation between each address of the disk 1 and a reading velocity necessary to read out the contents at that address (this data is recorded in advance in a program area on the disk 1, for example), to store the acquired data in a RAM 35, and to transmit a search address which is designated when a search command is given by a user through a keyboard (not shown) or the like, and data representing its corresponding reading velocity to the SCSI bus 31. It is to be noted that the host computer 32 may be designed to acquire data indicating the correlation between each address of a plurality of CD-ROMs and a reading velocity which is necessary to read out the contents at that address and store the data in the RAM 35 in advance.

Figure 2:
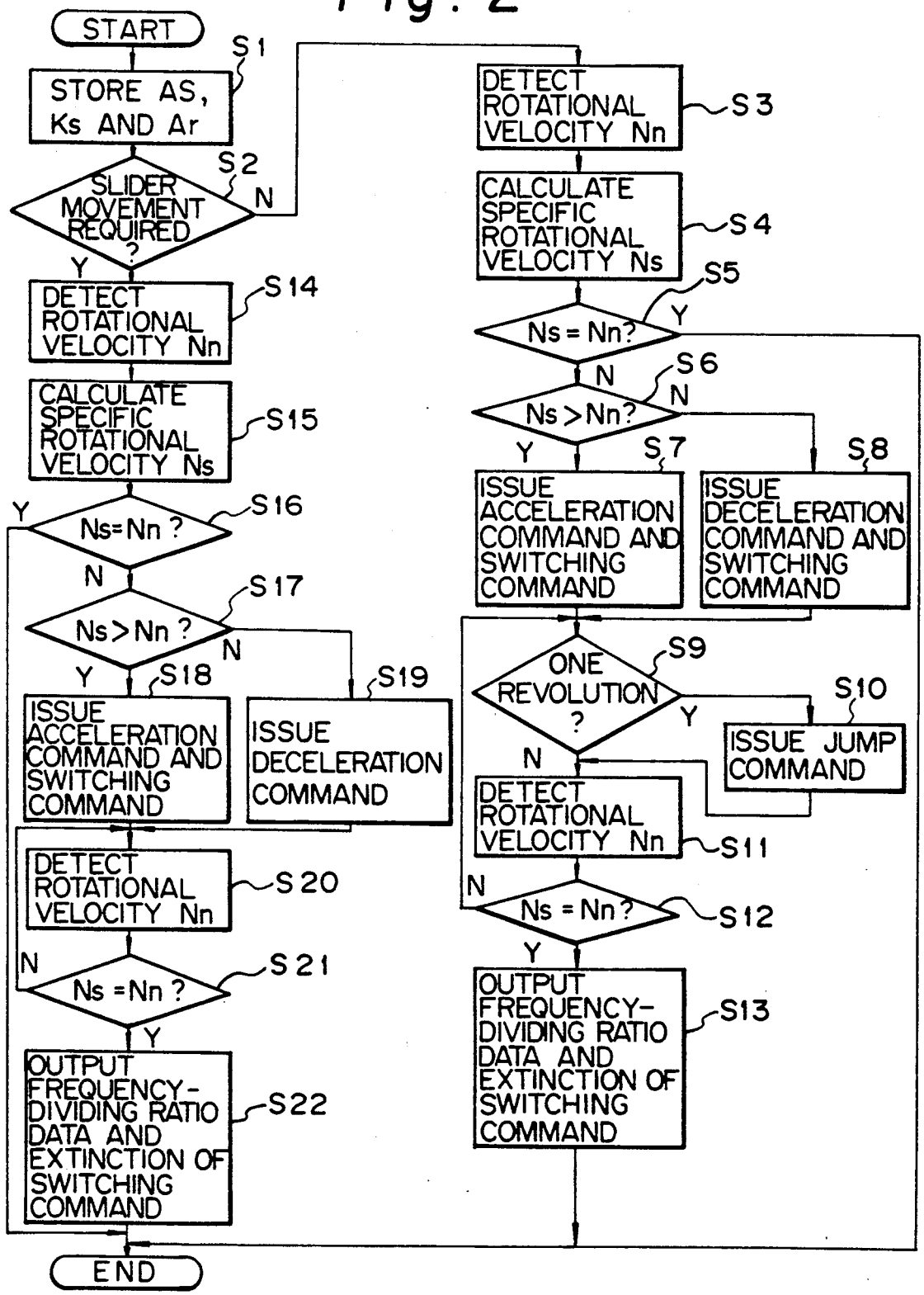
FIG. 2 is a flowchart illustrating the operation of a processor which constitutes a controller 10 in the apparatus shown in FIG. 1.

The operation of the processor of the controller 10 in the thus constituted apparatus will be described below referring to the flowchart given in FIG. 2.

When a search command is issued by the use during execution of the main routine and the processor receives the search command together with search address data As designating a search address data and velocity data Ks designating a reading velocity from the host computer 32 through the SCSI bus 31 and SCSI controller 30, the processor proceeds the routine to step S1. In step S1 the processor detects the address being read currently, from the output data of the subcode detector 6, sets data representing this address to reading address data Ar, and stores Ar together with the search address data As, the velocity data Ks and velocity data Kr corresponding to the reading address data Ar, which has already been supplied before the routine proceeds to step S1, at a predetermined address in the RAM. It is to be noted that in step S1 address data acquired from the output of sync-and-header detector 25 may be used as the reading address data Ar. The processor then determines whether or not movement of the slider 9 carrying the pickup 3 is necessary depending on whether or not the difference between the reading address data and search address data As stored at the predetermined address in the RAM is equal to or less than a predetermined value (step S2).

If it is judged in step S2 that no movement of the slider 9 is necessary, the processor measures the cycle of an FG pulse from the FG pulse generator 19 to detect a current rotational velocity Nn of the disk 1 (step S3), and computes a normal rotational velocity Ns required to read out the contents at the search address from this rotational velocity Nn and the velocity data Ks and Kr stored at the predetermined address in the RAM (step S4). In step S4, when the velocity data Kr represents the normal velocity and the velocity data Ks represents the double velocity, for example, the normal rotational velocity Ns can be acquired by multiplying the rotational velocity Nn by "2".

Then, the processor determines whether or not the normal rotational velocity Ns equals the rotational velocity Nn (step S5). If it is judged in step S5 that Ns equals Nn, the processor resumes the routine which has been executed immediately before proceeding to step S1. If it is judged in step S5 that Ns is not equal to Nn, the processor determines whether or not Ns is greater than Nn (step S6).

When it is judged in step S6 that the normal rotational velocity Ns is greater than the rotational velocity Nn, the processor sends an acceleration command to the acceleration/deceleration signal generator 16 and a switching command to the switch 15 (step S7). When it is judged in step S6 that Ns is not greater than Nn, on the other hand, the processor sends a deceleration command to the acceleration/deceleration signal generator 16 and the switching command to the switch 15 (step S8).

After executing step S7 or S8, the processor detects the presenting reading address from the output data of the subcode detector 6, and determines if the disk 1 has made one revolution after the issuance of the search command, from the difference between the detected address and the read address Ar stored at the predetermined address in the RAM (step S9). When judging that the disk 1 has rotated one time in step S9, the processor sends a command to jump inward to the driver 34 (step S10), measures the cycle of the FG pulse from the FG pulse generator 19 to detect the current rotational velocity Nn of the disk 1 (step S11), and determines whether or not the normal rotational velocity Ns computed in step S3 equals the rotational velocity Nn detected in step S11 (step S12). When the processor judges in step S9 that the disk 1 has not made one turn yet, it immediately executes operations in steps S11 and S12.

When the processor judges in step S12 that the normal rotational velocity Ns equals the rotational velocity Nn, it sends frequency-division data representing a frequency-dividing ratio corresponding to the velocity data Ks, stored at the predetermined address in the RAM, to the reference signal generator 14 and stops supplying the switching command to the switch 15 (step S13). The processor then resumes the routine which has been executed immediately before going to step S1. When judging in step S12 that the normal rotational velocity Ns does not equal the rotational velocity Nn, the processor returns to step S9.

When the processor judges in step S2 that the slider 9 should be moved, it measures the cycle of the FG pulse from the FG pulse generator 19 to detect the current rotational velocity Nn of the disk 1 (step S14) and computes the normal rotational velocity Ns required to read out the contents at the search address from the search address data As and velocity data Ks stored at the predetermined address in the RAM (step S15). In step S15, the normal rotational velocity Ns (rpm) can be calculated from the following equation (1):

$$Ns = Ks \times \frac{15257}{\sqrt{Ts + 944}} \tag{1}$$

where Ts (sec) is a time code as the search address data As and Ks (Ks: a positive integer, such as 1, 2 or 4) is the velocity data, both stored at the predetermined address in the RAM.

The equation (1) is theoretically obtained when the track pitch $\rho$ of the disk 1 and the linear velocity v at the time data is read out from the disk 1 are set to typical values defined in the specifications of CD-ROM disks ($\rho$=1.6 μm, v=1.3 m/s).

Then, the processor executes steps S16 to S19 similar to steps S5 to S8, measures the cycle of the FG pulse from the FG pulse generator 19 to detect the current rotational velocity Nn of the disk 1 (step S20), and determines whether or not the normal rotational velocity Ns computed in step S3 equals the rotational velocity Nn detected in step S20 (step S21).

When judging in step S21 that the normal rotational velocity Ns does not equal the rotational velocity Nn, the processor returns to step S20. When the processor judges in step S21 that the normal rotational velocity Ns equals the rotational velocity Nn, it sends frequency-division data representing a frequency-dividing ratio corresponding to the velocity data Ks, stored at the predetermined address in the RAM, to the reference signal generator 14 and stops supplying the switching command to the switch 15 (step S22). The processor then resumes the routine which has been executed immediately before proceeding to step S1.

If the movement of the slider 9 is unnecessary in steps S3 to S13 in the above operation, the spindle servo loop for driving the spindle motor 2 is rendered open by the output of the frequency phase controller 12, and a pause is applied, during which the rotational velocity of the disk 1 is increased or decreased to coincide with the normal rotational velocity for the search address. The spindle servo loop is then closed. If the slider 9 should be moved, the spindle servo loop is rendered open in steps S14 to S22 to increase or decrease the rotational velocity of the disk 1 to be equal to the normal rotational velocity for the search address, then the spindle servo loop is closed. The routine for moving the slider 9, though not shown, is executed in parallel to the sequential process of steps S14 to S22.

In searching for recorded data on a disk where multiple types of data that should be read out at different reading velocities are recorded, the rotational velocity of the disk is changed in a single step to the velocity necessary to read out the recorded data at the search address and the spindle servo loop is closed, thereby locking the spindle servo loop quickly and stably, and the searching can be performed more quickly.

Figure 3:
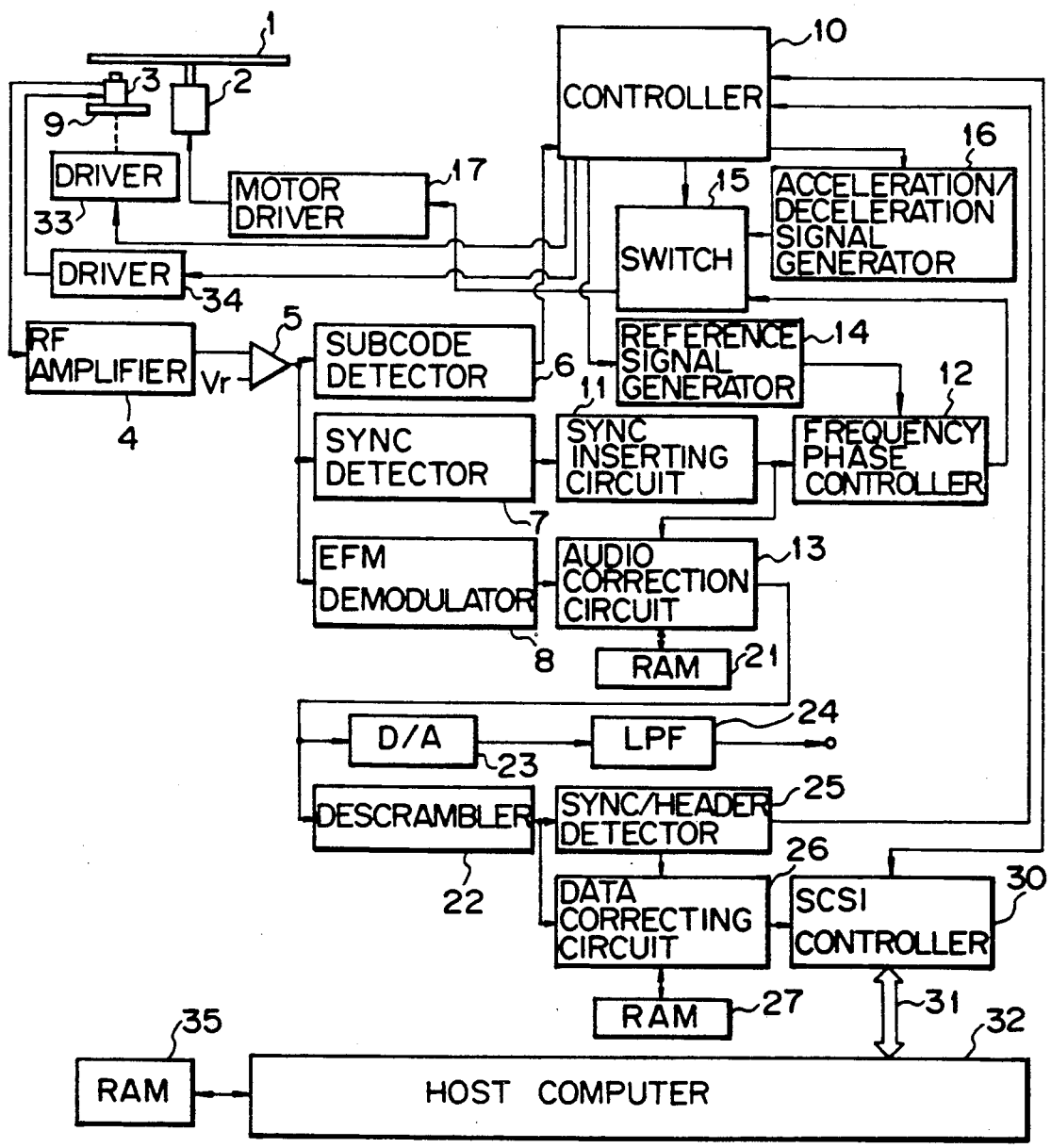
FIG. 3 is a block diagram of another embodiment of the present invention.
Figure 4:
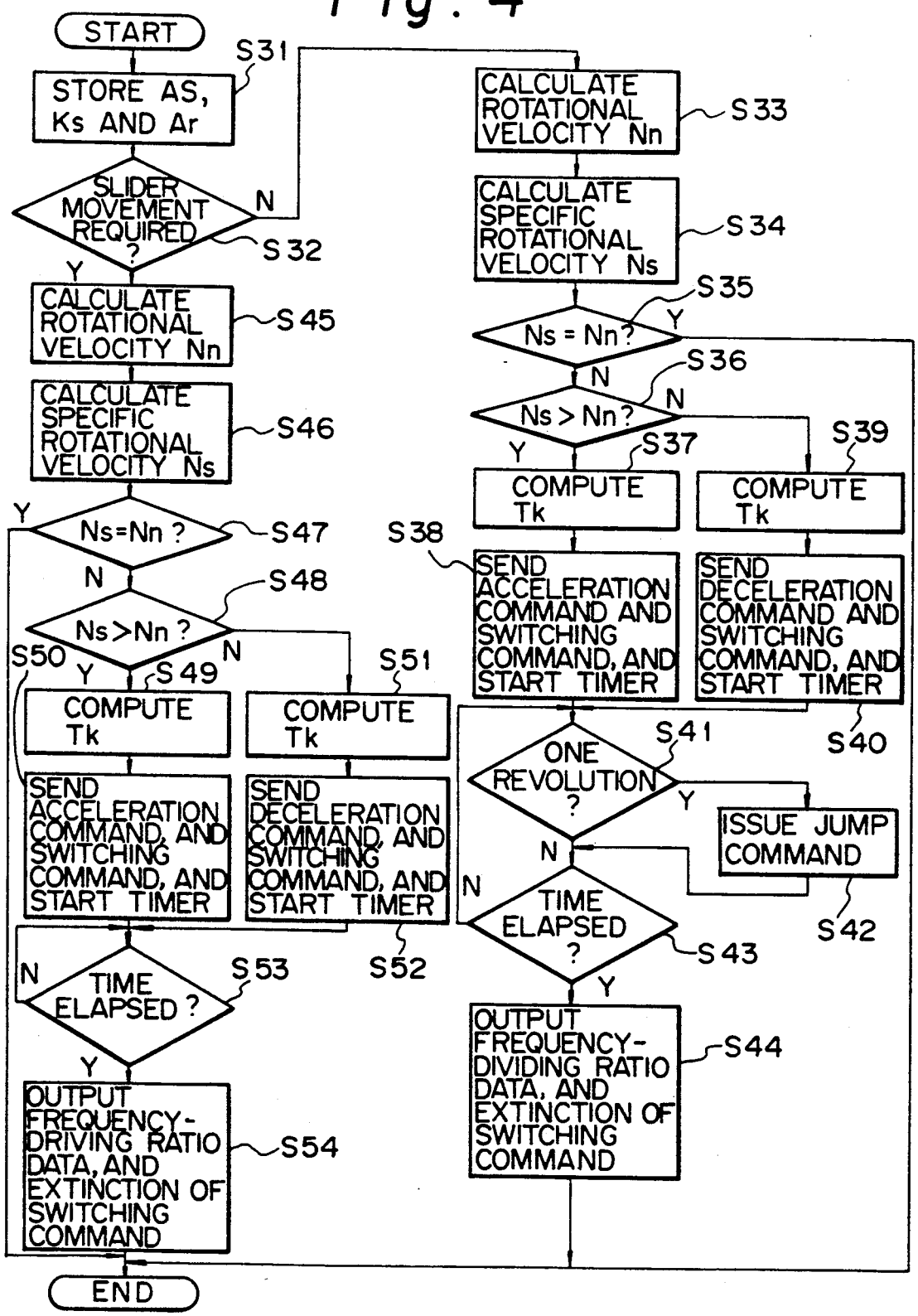
FIG. 4 is a flowchart illustrating the operation of a processor which constitutes a controller 10 in the apparatus shown in FIG. 3.

FIG. 3 is a block diagram illustrating another embodiment of the present invention, which has the same structure as the one shown in FIG. 1 except that the frequency generator 18 and FG pulse generator 19 are eliminated. The operation of the processor of the controller 10 in the thus constructed apparatus will be described below referring to the flowchart given in FIG. 4.

When a search command is issued by the user during execution of the main routine and the processor receives the search command together with search address data As specifying a search address and velocity data Ks specifying a reading velocity from a host computer 31 through a SCSI bus and SCSI controller 32, the processor moves the routine to step S31. Then, the processor executes steps operations in S31 and S32 similar to those in steps S1 and S2 shown in FIG. 2.

If it is judged in step S32 that no movement of the slider 9 is required, the processor computes a current rotational velocity Nn (rpm) from reading address data Ar (sec) and velocity data Kr (Kr: a positive integer, such as 1, 2 or 4) both stored at a predetermined address in the RAM (step S33), and computes a normal rotational velocity Ns required to read out the contents at the search address from this rotational velocity Nn and the velocity data Ks and Kr stored at the predetermined address in the RAM (step S34). In step S33, the rotational velocity Nn (rpm) is acquired from the following equation (2):

$$Nn = Kr \times \frac{15257}{\sqrt{Ar + 944}} \tag{2}$$

In step S34, when the velocity data Kr represents the normal velocity and the velocity data Ks represents the double velocity, for example, the normal rotational velocity Ns can be acquired by multiplying the rotational velocity Nn by "2".

Then, the processor determines whether or not the normal rotational velocity Ns equals the rotational velocity Nn (step S35). If it is judged in step S35 that Ns equals Nn, the processor resumes the routine which has been executed immediately before advancing to step S31. If it is judged in step S35 that Ns is not equal to Nn, the processor determines whether or not Ns is greater than Nn (step S36).

When it is judged in step S36 that the normal rotational velocity Ns is greater than the rotational velocity Nn, the processor computes a time Tk (ms) corresponding to the difference between the normal rotational velocity Ns (rpm) and the rotational velocity Nn (rpm) from the following equation (3) (step S37). The processor then sends an acceleration command to the acceleration/deceleration signal generator 16 and also a switching command to the switch 15, and starts the timer (step S38).

$$Tk = \frac{Ns - Nn}{\alpha} \tag{3}$$

wherein $\alpha$ (rpm/ms) is a coefficient according to the determined by measuring this characteristic of the motor 2 in advance.

When judging in step S36 that the normal rotational velocity Ns is not greater than the rotational velocity Nn, the processor computes the time Tk corresponding to the difference between the normal rotational velocity Ns and the rotational velocity Nn from the following equation (4) (step S39). The processor then sends a deceleration command to the acceleration/deceleration signal generator 16 and also a switching command to the switch 15, and starts the timer (step S40).

$$Tk = \frac{Ns - Nn}{\beta} \tag{4}$$

wherein $\beta$ (rpm/ms) is a coefficient according to the decelerating characteristic of the spindle motor 2 and is determined by measuring this characteristic of the motor 2 in advance.

After executing step S38 or S40, the processor detects the presenting reading address from the output data of the subcode detector 6, and determines if the disk 1 has made one turn since the issuance of the search command, from the difference between the detected address and the read address Ar stored at the predetermined address in the RAM (step S41). When it is judged that the disk 1 has rotated one time in step S41, the processor sends a command to jump inward to the driver 34 (step S42), and determines whether or not the time Tk has elapsed based on the output data of the timer which has started in step S38 or S40 (step S43). When the processor judges in step S41 that the disk 1 has not made one revolution yet, it immediately executes the operation in step S43.

When it is judged in step S43 by the processor that the time Tk has elapsed, it sends frequency-division data representing a frequency-dividing ratio corresponding to the velocity data Ks, stored at the predetermined address in the RAM, to the reference signal generator 14 and stops supplying the switching command to the switch 15 (step S44). The processor then resumes the routine which has been executed immediately before going to step S31. When it is judged in step S43 that the time Tk has not elapsed, the processor returns to step S41.

When the processor judges in step S32 that the slider 9 should be moved, it computes the current rotational velocity Nn by substituting the reading address data Ar and velocity data Kr, both stored at the predetermined address in the RAM, into the aforementioned equation (2) step (S45), and computes the normal rotational velocity Ns required to read out the contents at the search address from the equation (1) using the search address data As and velocity data Ks and Kr, all stored at the predetermined address in the RAM (step S46).

Then, the processor executes steps S47 to S52 similar to steps S35 to S40, and determines whether or not the time Tk has elapsed (step S53). When judging in step S53 that the time Tk has not elapsed, the processor returns to step S53. When the processor judges in step S53 that the time Tk has elapsed, it sends frequency-division data representing a frequency-dividing ratio corresponding to the velocity data Ks, stored at the predetermined address in the RAM, to the reference signal generator 14 and stops supplying the switching command to the switch 15 (step S54). The processor then resumes the routine which has been executed immediately before going to step S31.

If the movement of the slider 9 is unnecessary in the above operation, like in the apparatus shown in FIG. 1, a pause is applied, during which the rotational velocity of the disk 1 is increased or decreased to coincide with the normal rotational velocity for the search address. The spindle servo loop is then closed. If the slider 9 should be moved, the spindle servo loop is closed after the rotational velocity of the disk 1 is increased or decreased to be equal to the normal rotational velocity.

Accordingly, the spindle servo loop is locked quickly and stably, thus improving the searching velocity.

As described in detail above, according to the first aspect of the present invention, a spindle control apparatus for a disk player for reading out recorded data at a designated address on a disk having address data indicating a recording position recorded thereon in addition to a coded data signal and a sync signal and reproducing the recorded data, comprises memory means for storing in advance data representing a correlation between each address of the disk and a reading velocity necessary to read out contents of each address; reading means for reading out recorded data from the disk; sync detecting means for detecting a sync signal and producing a sync detection signal; first signal generating means for generating a first signal according to a frequency difference and a phase difference between the sync detection signal and a reference signal of a frequency according to a reading velocity corresponding to the designated address; drive means for driving the disk in response to a drive signal; a rotational velocity detecting means for detecting a rotational velocity of the disk, a second signal generating means for generating a second signal according to a difference between a value acquired by computing a rotational velocity of the disk necessary to read out recorded data at a reading velocity corresponding to the designated address in response to a command and a value of the rotational velocity detected by the rotational velocity detecting means, and outputting the second signal together with a switching command signal until the computed value and the detected value coincide with each other; and signal selecting means for selectively supplying the first signal as the drive signal to the drive means when switching command signal is not present and selectively supplying the second signal as the drive signal to the drive means when the switching command signal is present.

As another embodiment, a spindle control apparatus for a disk player for reading out recorded data at a designated address on a disk having address data indicating a recording position recorded thereon in addition to a coded data signal and a sync signal and reproducing the recorded data, comprises memory means for storing in advance data representing a correlation between each address of the disk and a reading velocity necessary to read out contents of each address; reading means for reading out recorded data from the disk; sync detecting means for detecting a sync signal and producing a sync detecting signal; first signal generating means for generating a first signal according to a frequency difference and a phase difference between the sync detection signal and a reference signal of a frequency according to a reading velocity corresponding to the designated address; drive means for driving the disk in response to a drive signal; address data detecting means for detecting address data; second signal generating means for generating a second signal according to a difference between a detected value of a rotational velocity of the disk acquired by the address data obtained by the address data detecting means and a value acquired by computing a rotational velocity of the disk necessary to read out recorded data at a reading velocity corresponding to the designated address in response to a command, and outputting the second signal together with a switching command signal for a period of time corresponding to the difference; and signal selecting means for selectively supplying the first signal as the drive signal to the drive means when the switching command signal is not present and selectively supplying the second signal as the drive signal to the drive means when the switching command signal is present.

In the spindle control apparatuses for a disk player, which embodies the present invention, a spindle servo loop for controlling the rotational velocity in accordance with a sync signal read out from a disk is rendered open in response to a command and the disk's rotational velocity is accelerated or decelerated in a single step until it coincides with a value necessary to read out recorded data at a designated address at a designated reading velocity. The servo loop is closed when these values coincide with each other. As a result quick and stable locking of the spindle servo loop during the searching time is assured, so that the searching velocity is raised considerably.

What is claimed is:

1. A spindle control apparatus for a disk player for reading out recorded data at a designated address on a disk having address data indicating a recording position recorded thereon in addition to a coded data signal and a sync signal and reproducing the recorded data, comprising:

memory means for storing in advance data representing a correlation between each address of the disk and a reading velocity necessary to read out contents of each address;

reading means for reading out recorded data from the disk;

sync detecting means for detecting a sync signal and producing a sync detection signal;

first signal generating means for generating a first signal according to a frequency difference and a phase difference between the sync detection signal and a reference signal of a frequency according to a reading velocity corresponding to the designated address;

drive means for driving the disk in response to a drive signal;

rotational velocity detecting means for detecting a rotational velocity of the disk;

second signal generating means for generating a second signal according to a difference between a value acquired by computing a rotational velocity of the disk necessary to read out recorded data at a reading velocity corresponding to the designated address in response to a command and a value of the rotational velocity detected by the rotational velocity detecting means, and outputting the second signal together with a switching command signal until the computed value and the detected value coincide with each other; and signal selecting means for selectively supplying the first signal as the drive signal to the drive means when the switching command signal is not present and selectively supplying the second signal as the drive signal to the drive means when the switching command signal is present.

2. A spindle control apparatus for a disk player for reading out recorded data at a designated address on a disk having address data indicating a recording position recorded thereon in addition to a coded data signal and a sync signal and reproducing the recorded data, comprising:

memory means for storing in advance data representing a correlation between each address of the disk and a reading velocity necessary to read out contents of each address;

reading means for reading out recorded data from the disk;

sync detecting means for detecting a sync signal and producing a sync detection signal;

first signal generating means for generating a first signal according to a frequency difference and a phase difference between the sync detection signal and a reference signal of a frequency according to a reading velocity corresponding to the designated address;

drive means for driving the disk in response to a drive signal;

address data detecting means for detecting address information;

second signal generating means for generating a second signal according to a difference between a detected value of a rotational velocity of the disk acquired by the address information obtained by the address information detecting means and a value acquired by computing a rotational velocity of the disk necessary to read out recorded data at a reading velocity corresponding to the designated address in response to a command, and outputting the second signal together with a switching command signal for a period of time corresponding to the difference; and signal selecting means for selectively supplying the first signal as the drive signal to the drive means when the switching command signal is not present and selectively supplying the second signal as the drive signal to the drive means when the switching command signal is present.

* * * * *